United States Patent Office 3,033,046
Patented May 8, 1962

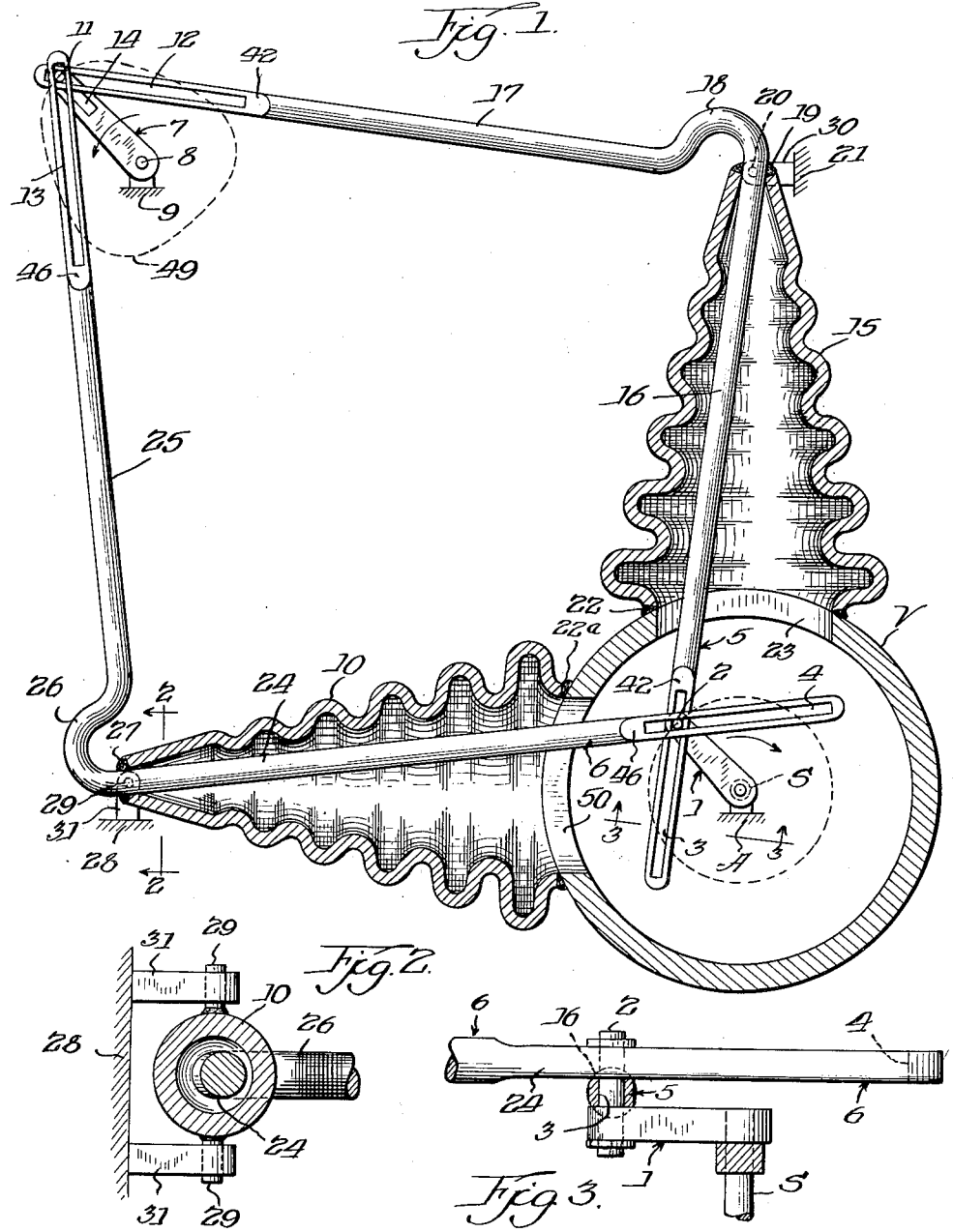

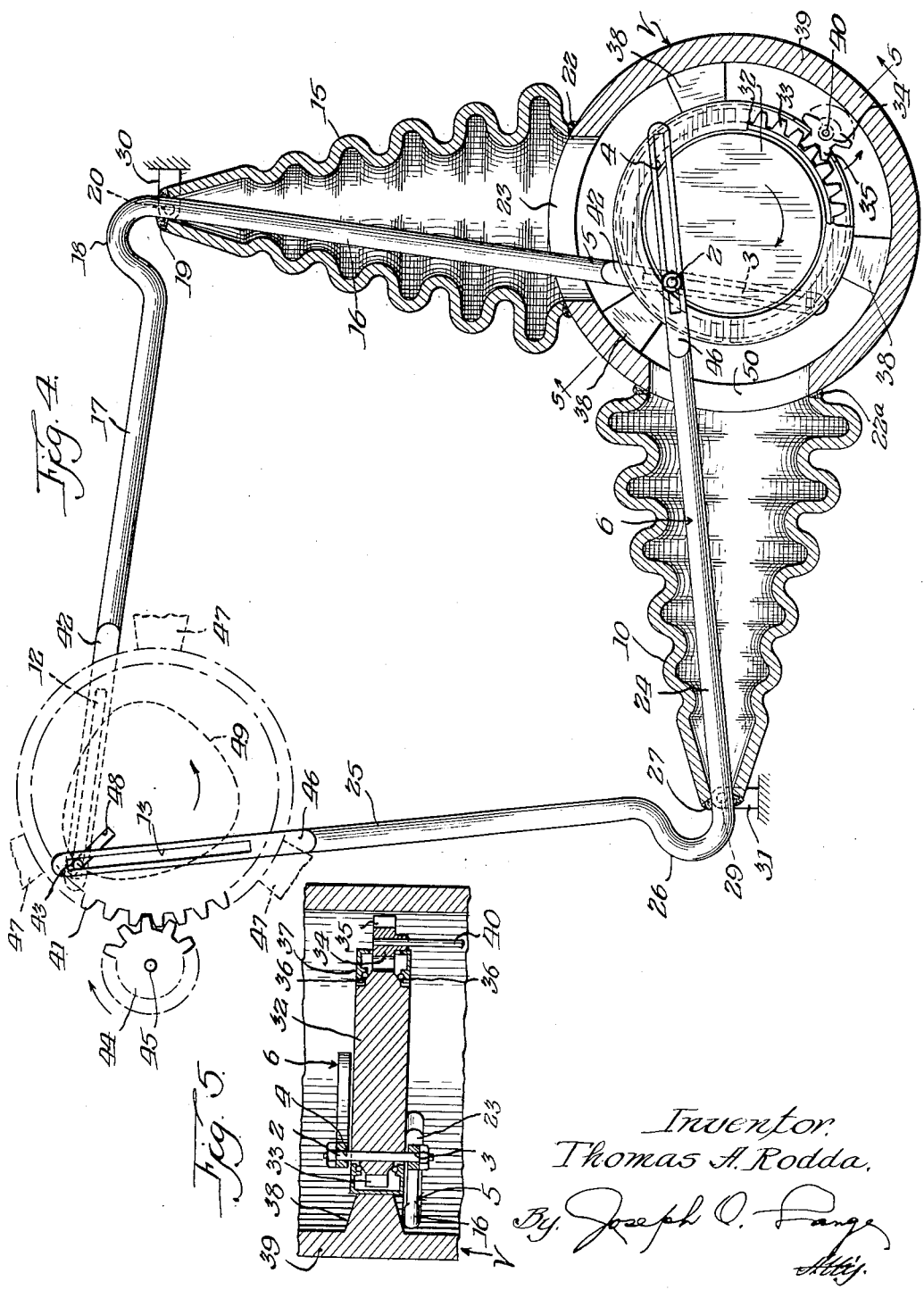

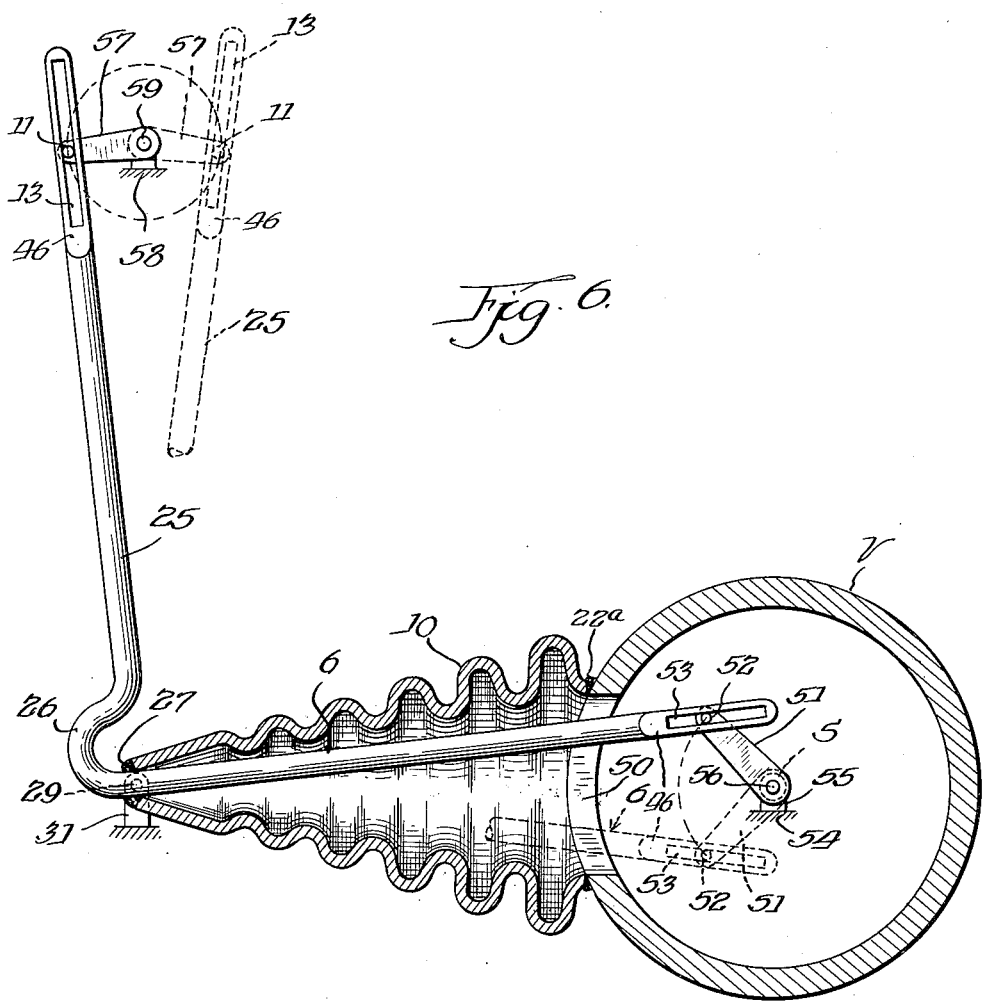

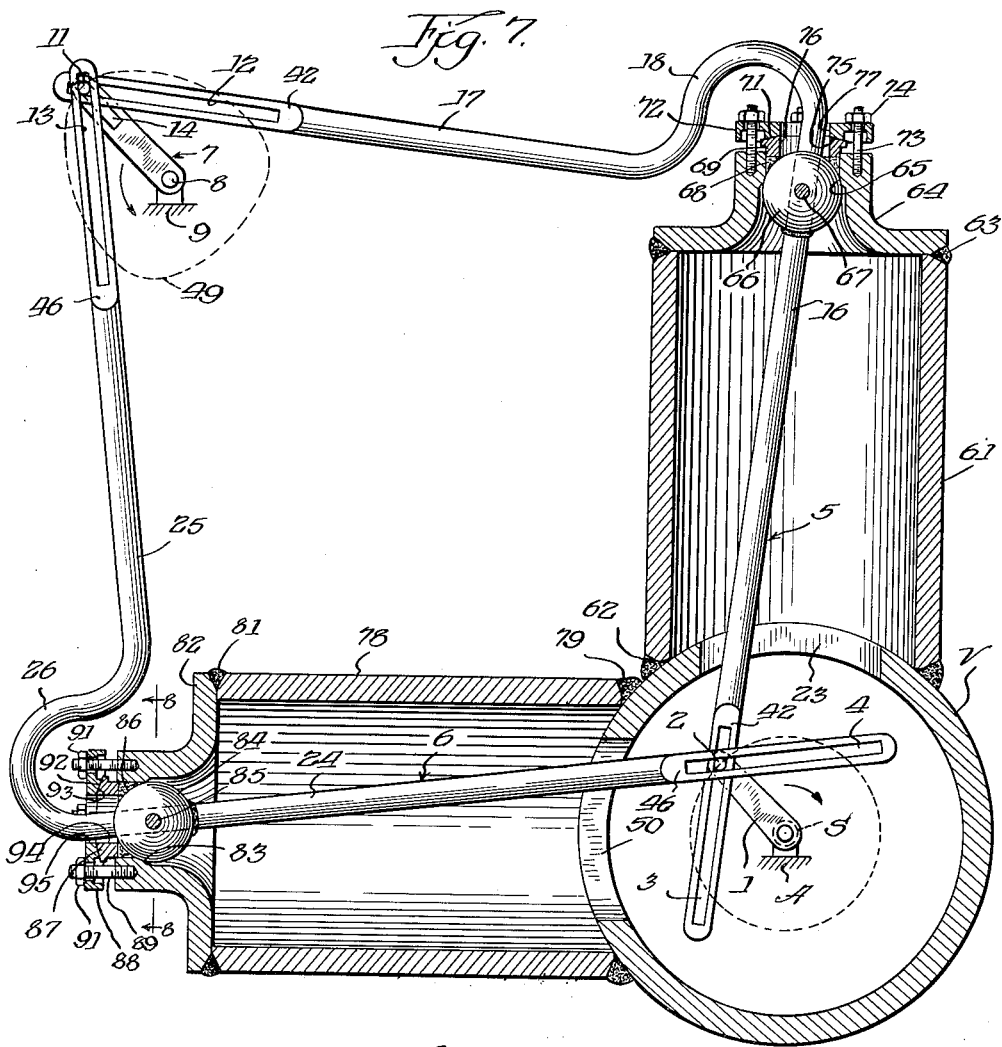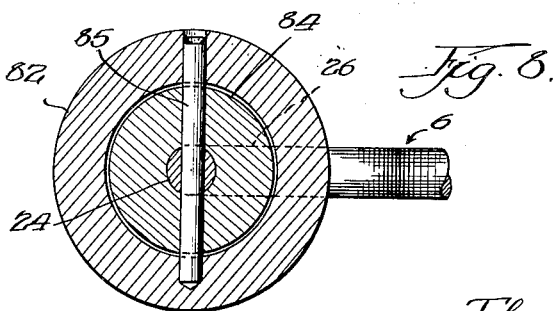

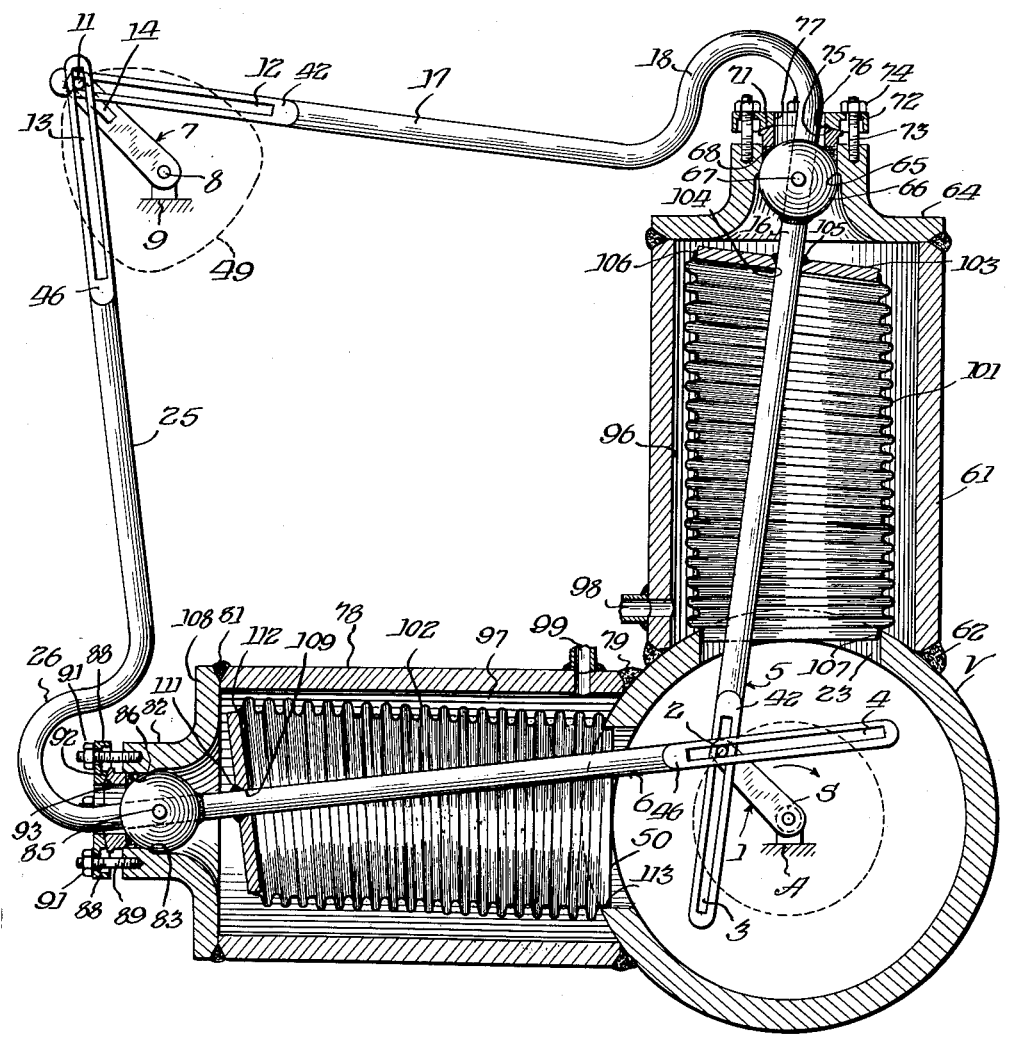

3,033,046
ACTUATING MECHANISM FOR IMPARTING ROTARY MOTION THROUGH A PRESSURE VESSEL
Thomas A. Rodda, Villa Park, Ill., assignor to Crane Co., Chicago, Ill., a corporation of Illinois
Filed May 29, 1959, Ser. No. 816,882
20 Claims. (Cl. 74—18.1)

This invention relates broadly to an actuating mechanism for the transmission of rotary motion through a pressure vessel wall or the like. More specifically, the prime purpose of this invention is to provide a mechanism in which rotary motion through such leakproof sealing means as a bellows can be transmitted in a pressure vessel to operate a variety of rotating shaft mechanisms. In the latter connection, it has been found that valve stems for example may be actuated through a yoke sleeve or else a non-rising stem valve may be directly actuated, or a pump impeller or other shaft driven device may be rotated or general application of the mechanism made to any device requiring rotary motion at some stage of its operation.

In order to have a greater appreciation of the use of this type of mechanism, it should be appreciated that in a pressurized water reactor, for example, absolutely no fluid leakage is permissible and it is with this type of severe requirement in mind that this actuating mechanism has been developed. It might be added in such cases however in which absolute tightness of seal is not required, the invention does permit the use of a less costly construction in a spherical surface to be provided on the connecting rod, as hereinafter apparent, for effecting a fluid seal. At the pivot end, as an added safeguard, the construction also allows for a stuffing box of the conventional type to be employed.

Another object of the instant construction therefore is to provide an actuating mechanism in which there is considerable flexibility in the fluid sealing construction available and thus substantial variations may be made without departing from the severe requirement of absolute tightness in the fluid sealing function. Further the structure is one in which flexible bellows may easily be used to effect such tightness in a large number of installations as will hereinafter become apparent.

A further object is to provide for a rotary motion transmission mechanism in which one or two right angle connecting rods may be employed, preferably oscillated by a driving crank and acting through a guided sliding pin to provide such desired motion.

Another object is to provide for an actuating construction in which the use of stuffing boxes and packings may be dispensed with, especially in such cases where other forms of more positive fluid sealing are preferably employed.

Another important object is to provide for a rotary motion transmission device generally less costly to manufacture than the types heretofore known and one in which a uniformly deflecting bellows may be used with considerable success.

Other objects and advantages will become more readily apparent upon proceeding with the description read in light of the accompanying drawings, in which:

FIG. 1 is a sectional assembly view of a preferred form of the actuating mechanism embodying my invention for transmitting the rotary motion through the wall of a pressure vessel;

FIG. 2 is a sectional view taken on the line 2—2 of FIG. 1;

FIG. 3 is a transverse sectional view taken on the line 3—3 of FIG. 1;

FIG. 4 is a modified form of the invention;

FIG. 5 is a transverse sectional assembly view taken on the line 5—5 of FIG. 4;

FIG. 6 is a modified form of the actuating mechanism useful with such types of valves or apparatus in which only part of a cycle or rotation for operation is necessary;

FIG. 7 is a further modified sectional view of the motion transmission mechanism embodying my invention;

FIG. 8 is a sectional assembly view taken on the line 8—8 of FIG. 7; and

FIG. 9 is a sectional assembly view of a still further modified form of the device embodying my invention.

Similar reference numerals refer to similar parts throughout the several views.

Referring now to FIG. 1, it should be understood at the outset that the motion transmission mechanism of my invention is directly or indirectly connected to a stem or shaft shown in vertical section in dotted lines designated S and cooperating with either a plug valve, or a rising stem or non-rising stem valve, with an indication that there is an attachment as at A to a fixed member such as a valve yoke, valve body, or a valve bonnet. When viewed in plan as shown in FIG. 1, the pivot points 20 and 29, and the crank shafts S and 8, respectively, are equidistant apart and each centerline is normal to, or 90 degrees from, the adjacent centerline. In other words the pivot points and crank shafts centerlines are located in the corners of a square formed by the centerlines in the plan view.

Non-rotatably attached as by means of any suitable locking mechanism, such as a pin (not shown) a driven crank generally designated 1 is shown having fixedly attached thereto a vertical disposed pin 2 movable predeterminately within the slots 3 and 4 of the right angle connecting rods in lower and upper planes and generally designated 5 and 6 respectively. It will be understood that the pin 2 is of a length sufficient to allow for its sliding movement as the driver crank 7 pivotally mounted at 8 is actuated, the pin being fixedly attached as indicated diagrammatically to a fixed member 9 say manual means, motor shaft or gears depending upon the size of the element or member to be moved or the nature of the services required. At the opposite end of the driver crank 7, the pin 11 projects, being slidably movable within the slots 12 and 13 of the right angle connecting rods 5 and 6 respectively. It should be understood that in connection with FIG. 1 and throughout all of the figures hereinafter described the connecting rods are flat on top and bottom at both ends in the area adjacent to the slots 3, 4, 12 and 13. Also it should be clear that instead of the said slots a conventional sleve and sliding bearing construction may be used.

It will also be appreciated that as the driver crank 7 is oscillated, the pin 11 will also move slidably within the longitudinal slot 14 of the crank 7. Thus, it will be apparent that the driving crank 7 oscillates the two right angle connecting rods 5 and 6 by means of the respective slidably movable pins 11 and 2. It will also be appreciated that in order to allow for proper pressure sealing, since the pressure vessel V contains the valve stem S, a suitable sealing mechanism is necessary. This result is accomplished by employing the corrugated conical bellows 15 and 10 having a fluid sealing attachment with the angular portion of the connecting rod 5 at the intersection of the leg 16 with the leg 17 and having the rod offset portion 18 weld sealed as at 19 preferably having the bellows 15 at this point fixedly supported as diagrammatically indicated at 21. The opposite or the large end of the bellows 15 is joined in fluid sealing connection to the pressure vessel V at 22 adjacent the aperture 23, with the corrugated bellows 10 being welded as at 22a to the pressure vessel V.

In much the same manner as described in connection with the attachment of the legs 16 and 17 of the right angle connecting rod 5, the right angle connecting rod 6, has the leg portions 24 and 25 connected by the offset 26 and annularly weld sealed as at 27 to the bellows 10. Also similarly, the point of pivotal attachment to the fixed member 28 is by means of the oppositely disposed pins 29 (see FIG. 2) journaled on the fixed lug 31 and applied at 20 and 29 respectively. The type of attachment effected is more clearly shown in the sectional view in FIG. 2 in which it will be noted that the leg portion 25 with the offset 26 is held on the bellows 10 by means of the oppositely disposed pins 29.

The rod offset portions at 18 and 26 respectively permit the location of the pivots for the connecting rods to be made at the intersection of the connecting rod centerlines. These pivot locations provide for a minimum lateral deflection of the bellows 10 and 15.

Thus an effective and simple arrangement is provided for transmitting rotary motion through a pressure vessel wall to a shaft, a valve stem or the like.

Referring now to FIG. 4, a further modified form is illustrated in which similarly the device provides for transmitting rotary motion through the wall of the pressure tight vessel and as will hereinafter be more readily apparent an increased mechanical advantage is obtained by the use of gearing. Thus the arrangement can also be used to operate a relatively large valve or other mechanism employing a rotary shaft. In this modified form, the advantages of lower bending moments on the driving and driven pins are also effected, in addition to other mechanical advantages obtained by the employment of gearing. In order to understand the merits of the gearing arrangement set forth in FIG. 4, it should be appreciated at the outset that what is termed by those skilled in the art as "input" gearing consists of the pinion 44 and the gear 41. The "output" gearing consists of the pinion 34 and the gear 32. The "output" gearing shown in section in FIG. 5 is identical to that for the "input" gearing with the exception that it is not mounted in a pressure vessel. Referring to FIG. 4, a driven pinion gear 34 in which a segmentary section of the driving teeth 35 is illustrated meshing with the driving gear 32 having the complementary gear teeth 33. In the same manner described in connection with FIGS. 1 to 3 inclusive, the right angle connecting rod 6 is provided with a slot 4 in which the pin 2 is slidably movable. The pin 2 as more clearly shown in sectional view of FIG. 5, extends through the output driving gear 32. The said driving gear 32 is thus driven by the output driving pin 2 which is fixedly attached to the gear 32 and slides within the lower and upper slots 3 and 4 of the rods 5 and 6 respectively during the course of transmitting such rotative movement to the gear 32. By such rotation the gear teeth 33 engaging the teeth 35 of the driven pinion 34 cause the shaft 40 to be rotated. It will be understood that here also the shaft 40 can be a valve stem or similar connection to any suitable shaft mechanism to be rotated. In this embodiment, the driven pinion gear 34 actuates the said valve stem in a direction of course opposite to that of the rotation of the driving gear 32, the teeth of the latter meshing with the teeth of the driven pinion gear 34 as illustrated. The pin 2 extending through the driven gear 32 engages the right angle connecting rod 5, the latter being slotted as at 3 with the straight extending portion 16 as described in the earlier figures and for the same purpose. The driving main gear 32 is preferably supported within a bearing race 36 as shown in FIG. 5. The race 36 contains the upper and lower ball bearings 37, the race being supported in spaced-apart relation annularly by means of the lugs 38 and integrally attached to the outer wall 39 constituting the pressure vessel V as shown more clearly in FIG. 5. Thus in this construction, it will be apparent that the main driving gear 32 serves as the spacer between the respective planes in which the right angle connecting rods 5 and 6 are mounted. In this construction, the pressure vessel V serves the function of not only containing the valve stem and the like, but it also serves as a support for the actuating mechanism. In the same manner as described in connection with FIG. 1, the conically formed bellows 15 is attached by means of an annular weld as at 22 to the pressure vessel V. At its upper end portion it is attached to the leg 16 of the right angle connecting rod generally designated 5 by means of the annular weld 19 and forms a connection which in cross section is similar to that shown in FIG. 2. This is accomplished as shown in FIG. 1 by means of the oppositely disposed lugs 30 carrying the oppositely journaled pins 20 by means of the connecting rod 16. The latter rod has the offset portion 18 connected with a straight length 17 of the rod. In this modification, as also in FIG. 1, the straight portion 17 is made flat on top and bottom to provide a substantial connection as indicated at 42 and is slotted as at 12 to receive the pin 43 extending therethrough. The latter member is also slidably movable within the slotted portion 13 of the right angle connecting rod 6 in the rod straight portion 25. Here, also, the input driven gear 41 has a driving pinion gear 44 rotatably mounted upon the shaft 45 and being connected to a driving motor source (not shown) in order to effect the desired rotation of the input driven gear 41 with which it is meshed. For the same reason as described in connection with the offset portion on the straight length 17, the rod portion 25 is made flat on top and bottom at 46. Likewise, in the assembly of the input driven gear 41, the latter is fixedly supported by means of the spaced-apart positioning lugs 47 as illustrated. Here it will be appreciated that these lugs are not a part of a pressure vessel. It will be further apparent that in much the same manner as described in connection with FIGS. 1 to 3 inclusive, in this embodiment the driving pinion gear 44 will impart rotary motion to the input driven gear 41, the teeth of each gear being meshed as indicated for such purpose. By reason of the rotative movement of the gears, as referred to, the pin 43 connecting both right angle rods 5 and 6 will move within the radially extending slot 48 of the gear 41. Upon such rotation taking place the pin thereby follows a path of rotation as indicated by the dotted lines 49.

Similarly, a rotary motion is thus imparted to the pivoting of the right angle connecting rods through legs 16 and 24 to the output driving gear 32 and to the driven pinion 34 whereby to rotate a valve stem 40 or other suitably mounted shaft means. Here it will also be apparent that in the same manner as described in connection with FIGS. 1 to 3 inclusive at the opposite end of the straight portion 25, the offset rod portion 26 is employed attached by the annular weld 27 to the conical bellows 10. The latter member has a connection with the oppositely disposed lugs 31 by means of the pins 29, again following the arrangement set forth in the sectional view of FIG. 2. At the opposite end of the bellows 10, the latter is attached by means of the annular weld 22a, as described in connection with FIG. 1, and in like manner encircling the lateral aperture 50 of the pressure vessel V. It will be clear that the method of effecting rotary movement through a vessel wall is identical to that described in connection with the previous figures, except that in this embodiment because of the desire for effecting a greater mechanical advantage, gearing has been employed. The arrangement also reduces the bending moment on both pins 43 and 2 respectively.

It will, of course, be appreciated that the specific manner of supporting the gear and pinion arrangement may vary substantially from the illustrated construction. This structure is also relatively simple and positive in its performance without involving an expensive mounting.

Referring now to a further modification of the mechanism as shown in the plan view of FIG. 6, in this embodiment arrangements are made to provide for a complete cycle of the driver at a constant speed to permit of a faster rotative movement in one direction of the driven crank than in the other direction. This result will hereinafter become apparent upon describing the construction, and it will also be clear that this modified form embodies the mechanical advantage that an increase of the driver crank length increases the sweep angle of the driven crank and vice versa with a decrease in length. The construction is particularly useful for the operation of certain types of valves, for example, such as plug valves, rotary valves, butterfly valves, and those other valves and devices which require for their proper functioning only a partial rotation, that is, not to exceed 90 degrees for their cycle of operation. In this modified construction, the pressure vessel V is shown within which the valve stem or shaft S is integrally attached to the driven crank 51. It is provided with a pin 52 slidably movable within the slot 53 of the right angle connecting rod generally designated 6. The fixed attachment represented at 54 is used in this embodiment to indicate a fixed mounting for the shaft S by means of connecting rigid arms fixedly mounted as at 55 to receive the journalling pin 56 of the driven crank 51. In the same manner as described previously, the pressure vessel is laterally ported as at 50 and weld sealed as at 22a to the base of the conical bellows 10 which at its opposite end is weld attached as at 27 to the oppositely disposed lugs 31 for journally receiving the pin 29 to form the same type of pivoting connection therewith as illustrated and described in reference to the sectional view of FIG. 2. The right angle connecting rod 6 at its corner portion is provided with the offset 26 and the straight length 25. The latter portion is slotted at its upper end portion as at 13 to slidably receive the pin 11 in the same manner as described in connection with FIG. 1. In this embodiment, a driven crank 57 attached to a fixed member 58 is pivotally mounted as at 59 and is actuated by any suitable driving method, as for example, by a reversible drive means in which case the lever 25 assumes the position shown in dotted lines by the rotation in either direction. As in the other figures, the method of fixed attachment at 58 is largely diagrammatic and is intended primarily to illustrate the manner in which the pivoting action is imparted to the right angle connecting rod 6 to oscillate a valve stem, plug, or other shaft or closure in the manner illustrated by the dotted lines, that is from open position to closed position in the usual manner for attaining operation in these types of valves. In all other respects, the operation of the rotary motion transmission mechanism is identical to that described in connection with the previous figures. In this embodiment it will be apparent that only a single lever is necessary in order to effect the desired movement of the valve shaft, plug or closure. The pivot point is located as in connection with the other figures at the pins 29. The bellows are designed for uniform deflection over their entire length, the corrugations permitting lateral deflection with relatively slight axial movement.

In a still further embodiment, attention is directed to FIG. 7, in which a stuffing box construction instead of a weld is employed for the connection between the rod and casing. In all other respects the method of operation is identical to that described in connection with FIGS. 1 to 3 inclusive. In this construction, a pair of right angle connecting rods generally designated 5 and 6 are employed, joined at their slotted intersection by means of the pin 2 slidable in the slot 4 of the rod 6 and slot 3 of rod 5, the pin 2 in the usual manner passing through the rotatably movable driven crank 1 and being attached as indicated at A to a fixed member such as a valve yoke or bonnet to actuate the rotatable shaft S. Here, likewise, the pressure vessel V is laterally ported as at 23 and 50, and over the opening 23, a tubular extension section 61 is weldably secured to the vessel V as at 62 by means of the annular weld as shown. At the upper end thereof, it is provided with another annular weld 63 for attaching the cap 64 to the pressure vessel lateral extension 61. In this construction, the cap on its inner surface portion is formed with a spheroidal formed surface 65 to receive the sphere 66. The latter member is pinned by the transversely extending hinge pin 67 to the straight portion 16 of the angle connecting rod 5. In the usual manner for effecting a stuffing box connection and forming a complementary fluid sealing surface for the sphere member 66, the annular packing 68 is placed in the stuffing box chamber immediately above the sphere 66. A packing gland 69 preferably having a spheroidal surface 71 is held in place by means of the gland flange 72 cooperating with the gland studs 73 and tightened in position by means of the gland nuts 74. Preferably, both the gland and the gland flange in order to permit adjustment in applying the packing compression load are provided with the respective spheroidal surfaces 71 and 75 and are preferably apertured as at 76 and 77 respectively to allow suitable clearance for the pivotal movement of the rod 5. The usual offset corner portion 18 is provided with the straight section 17 slotted as at 12 at its opposite end to receive the pin 11, the latter extending transversely through slotted portion 13 and being slidably movable within the slot 14 of the driving crank 7 pivotally mounted as at 8 to the fixed member 9. The right angle connecting rod 6 at its inner end portion engages the pin 2, the latter member extending through the rods 5 and 6 as well as the driven crank 1. The rod 6 as in the previous figures is provided with a straight portion 24 extending within the extension vessel tubular extension 78, the latter being weld secured to the pressure vessel V by means of the annular weld 79, as illustrated. At its upper end portion and in the same manner as described previously in connection with rod 5 in the other views, the annular weld 81 attaches the cap 82 to the tubular vessel 78. The cap 82 has the concave spherical surface 83 engaged by the pivotally movable sphere 84, the latter member being attached by means of the pin 85 to the rod 6. Similarly supplementing the fluid sealing function provided by concave surface 83 and the said sphere, the packing 86 is suitably interposed and held in place by means of the gland 87, the gland flange 88 and the usual stuffing box studs 89 and the nuts 91 therefor. In the same manner and for the same reason previously described, the convex and concave surfaces 92 and 93 are provided on the undersurface of the gland flange and the upper surface of the gland respectively. The apertures at 94 and 95 in the gland and the gland flange respectively permit the similar pivoting movement of the connecting rod 6 in the same manner as described in connection with the rod 5. The offset portion on the rod at 26 is used with the straightened portion 25 as previously described in connection with the other figures. In this modified construction, it will also be clear that as the crank 7 is actuated, the pin 11 will move in a path to follow a pattern indicated in the dotted lines 49. The said pin will move within the slot 14 of the driving crank 7, thereby causing the respective right angle connecting rods 5 and 6 to be pivoted and caused to rotate the driven crank 1 in the direction indicated by the arrow thereby to rotate the valve stem or shaft S.

The detailed manner of attachment of the sphere 84, which is identical to that described in connection with the rod 5, is more clearly shown in the cross sectional view of FIG. 8, in which it will be noted that the pin 85 preferably extends through the sphere engaging the rod on the straightened portion 24 to allow for a secure connection between the rod and the sphere. In this construction, it will also be noted that the device permits the transmitting of a circular motion into a pressure vessel V through a stuffing box seal and therefore makes it suitable for operating valves or other types of devices to be actuated and in which stuffing boxes are commonly employed. Of course, it will be obvious that the welds 63 and 81, and also 62 and 79, may be provided with bolted connections or threaded connections, if desired, depending upon the nature of the service encountered.

Referring now to a still further embodiment shown in FIG. 9, the pressure vessel V follows generally the pattern of construction as referred to in connection with FIG. 7, except that in this modified form the device for transmitting rotary motion into a pressure type vessel supplements the stuffing box by means of a relatively thin-walled bellows attachment contained within a reinforcing casing extension, with the respective right angle connecting rods 5 and 6 received therewithin. In view of the similarity in function ad the mode of operation the details of operation will be unnecessary. The respective chambers 96 and 97 are provided with the combined inlets and outlets 98 and 99 for the purpose of effecting the entry and discharge of compressible fluids to counterbalance internal fluid pressures inside and outside of the bellows in each of the respective chambers. This arrangement will compensate for the desirable but relatively thin wall of the bellows used while at the same time contributing to the flexibility in its overall performance. It will also be appreciated that automatic pressure sensing devices may be used to maintain control of the internal and external pressures within reasonable limits of the differential fluid pressure desired to be controlled as, for example, by pressure switches.

It will be noted that the connecting rods 5 and 6 have a weld seal attachment with the pressure vessel V by means of the corrugated bellows 101 and 102 in the chambers 96 and 97 respectively. At one end of the bellows 101, an annular end plate 103 is applied apertured at 104 to receive the weld seal 105. At its outer periphery the end plate 103 is welded as at 106 to the corrugated bellows 101. At the opposite end limit of the bellows 101, it is welded within the opening 23 by means of the annular weld 107.

In a similar manner, the bellows 102 is apertured as at 109 to receive the weld 111 while at its outer periphery it is annularly welded at 112 to the corrugated bellows 102. At its opposite end, the said bellows is attached in fluid sealing connection by an annular weld 113 to the pressure vessel and extending within the aperture 50 as as shown. The purpose of this embodiment is to give the assurance of additional security against leakage developed during the course of operation instead of relying merely on the stuffing boxes. It will be appreciated that under certain conditions as for example comparatively low pressures, it is possible to disperse with a stuffing box. The bellows add a further fluid seal without substantially interfering with the freedom of movement of the respective rods 5 and 6 during their course of actuation by the driving crank lever 7. As above referred to, a bellows construction may be sufficient for most installations.

While a substantial number of mechanisms have been illustrated and described, it will of course be appreciated this has been done only to indicate the broad application of the invention involved. Accordingly, the breadth of the invention should be measured by the scope of the appended claims.

I claim:

1. In an actuating mechanism for transmitting complete rotary motion through a pressure vessel wall to a rotatable shaft mounted in fluid sealing relation within the pressure vessel, the said mechanism comprising driver crank means, driven crank means, connecting rods of L-form connected at one end thereof to said driver crank means at substantially right angles to each other, said connecting rod means having transversely shiftable connections with the driver crank means and with the said driven crank means, corrugated flexible means having a tapered annular portion enclosing a leg portion of the said L-form connecting rods in fluid sealing relation, the said flexible means at one end thereof having fluid sealing connection with the pressure vessel interior, and at the other end thereof being connected in fluid sealing relation to the connecting rods, the latter connection being substantially reduced in size from the other end thereof, the said driven crank means being connected to the said rotatable shaft.

2. In an actuating mechanism for transmitting complete rotary motion through a pressure vessel wall to a rotatable shaft mounted in fluid sealing relation within the pressure vessel, the said mechanism comprising driver crank means, driven crank means, connecting rod means of L-form connected at one end thereof to said driver crank, said connecting rod means having transversely shiftable connections with the driver crank means and with the said driven crank means, a plurality of flexible tapered bellows means in 90 degrees spaced apart relation to each other enclosing a transverse leg portion of the said connecting rod means in fluid sealing relation, and making fluid sealing contact therewith on said leg portion imminent a corner portion of the rod providing the L-form, the said bellows means at one end thereof at a substantially enlarged portion thereof having fluid sealing connection with the interior of pressure vessel, the said driven crank means being rotatably connected to the said rotatable shaft, the central axes of said flexible tapered bellows means in said 90 degrees spaced apart relation intersecting in a plane defined by the axis of said rotatable shaft.

3. In an actuating mechanism for transmitting complete rotary motion through a pressure vessel wall to a rotatable shaft mounted in fluid sealing relation within the pressure vessel, the said mechanism comprising pivotally mounted driver crank means, pivotally mounted driven crank means, the pivotal mounting of the driver crank means and the driven crank means being fixed and spaced 90 degrees and equidistant apart when viewed in plan, a pair of connecting rods of L-form pivotally connected at one end thereof to said driver crank means, the said connecting rods being pivotally movable in different parallel planes and substantially at right angles to each other, said connecting rod means having slotted connections at end limits thereof with the driver crank means and with the said driven crank means respectively, fluid sealing means at a reduced portion thereof enclosing legs of the said connecting rod means in fluid sealing relation, the said fluid sealing means at one end thereof having an annular enlarged fluid sealing connection around a transverse ported portion of the pressure vessel, the said driven crank means being rotatably connected to the said rotatable shaft, centerlines drawn through said fixed pivotal mountings of the said driver crank means and driven crank means forming a 90 degree angle with each other and said fixed pivotal mountings being in number and spacing so arranged that when viewed in plan they form a square.

4. In an actuating mechanism for transmitting complete rotary motion through a pressure vessel wall to a rotatable shaft mounted in fluid sealing relation within the pressure vessel, the said mechanism comprising driver crank means, driven crank means, a pair of pivotally movable connecting rods of L-form arranged to form substantially a square when viewed in plan upon predetermined pivotal movement thereof, both rods being pivotally connected at one end thereof to said driver crank means, the said driver crank means and driven crank means having fixed pivotal connections 90 degrees apart, said connecting rod means having slidable pivotal connections with the driver crank means and with the said driven crank means arranged to permit predetermined transverse movement of the connecting rods relative to the driver crank and driven crank means, substantially conical bellows enclosing a leg portion of each of the said connecting rod means in fluid sealing relation, centerlines drawn through said fixed pivotal connections forming said 90 degree angle with each other and the spaces between said fixed pivotal connections being equal whereby to form a square when viewed in plan, the said bellows at one enlarged end thereof having fluid sealing connection with ported portions of the pressure vessel, the said driven crank means being rotatably connected to the said rotatable shaft, the latter member being fixed in its axis of rotation.

5. In a valve actuating mechanism for imparting rotary motion to a valve stem or the like, the said mechanism having elements movable in substantially a plane extending transversely relative to the axis of rotation of the stem and comprising driver crank means and driven crank means, the said pivotally movable angularly extending connecting rod means having connections between said driver crank and driven crank means, the said connecting rod means having leg portions defining a 90-degree angle therebetween when said leg portions are viewed in plan, said connecting rod means at opposite ends of the leg portions being connected to said driver crank and driven crank means with a slidable connection to permit relative transverse movement with both the driver crank and the driven crank, the said driven crank means being connected to said valve stem to rotate the latter member upon actuation by the said connecting rod means, the said connecting rod means leg portions being slidably movable transversely relative to each other at their slidable connection with said driver crank and driven crank means.

6. In a valve actuating mechanism for imparting rotary motion to a valve stem in a pressure vessel, the said mechanism having pivotally movable driver and driven elements movable in substantially a single plane and comprising driver crank means and driven crank means, means on each of the said driver crank and driven crank having a fixed attachment for said pivotal movement, the latter fixed pivotal connections being four in number and being spaced 90 degrees and equidistant apart to form a square configuration when viewed in plan, pivotally movable connecting rod means with angularly extending legs connecting the said driver crank and driven crank means mounted in fluid sealing relation to the pressure vessel, said connecting rod means being relatively loosely connected at end portions thereof to said driver crank and driven crank means to permit relative transverse movement therebetween, the fixed pivotal connections for the said driver crank means and said driven crank means being 180 degrees apart when viewed in plan the said driven crank means being rotatably connected to said valve stem.

7. In a valve actuating mechanism for imparting rotary motion to a valve stem or the like contained within a pressure vessel, the said mechanism having elements movable in substantially a common plane, the said elements comprising driver crank means and driven crank means pivotally mounted, the latter mounting of the said driver crank means and the driven crank means being disposed at 90 degrees to each other, angularly extending connecting rod means mounted in fluid sealing relation to the pressure vessel between said driver crank means and driven crank means, the said fluid sealing means including at least a single bellows of substantially conical configuration, said connecting rod means being joined to said driver crank and driven crank means with a pin and slot connection therebetween whereby to permit relative transverse movement between said driver crank and the said driven crank means and the said connecting rod means, the said driven crank means being connected to said valve stem to effect rotation of the latter member upon actuation of the connecting rod means by the said driver crank means, the centerlines of the connection of the said driver crank means and said driven crank means together with the centerlines of the connections for the said connecting rod means forming a 90 degree angle with each other when viewed in plan and the spacing of such centerlines axially being equidistant to form a square when viewed in plan.

8. A motion transmitting mechanism of the character described, the combination of a pressure vessel wall with a lateral opening, at least one bellows means thereon being attached to the wall at the opening, rigid enclosure means for the said bellows means, pivotally movable connecting rod means within the bellows means, the connecting rod means having a connection with a driving means and a driven means, the latter connecting means having elongated slotted portions at inner and outer end limits of the said connecting rod means permitting predetermined relative movement between the connecting rod means and the said driven means at end portions thereof, the said connecting rod means being attached to the said bellows means and to said rigid enclosure means in pressure sealed relation thereto permitting said pivotal movement of the connecting rod means at opposite ends thereof.

9. In a mechanism for transmitting rotary motion through a pressure vessel wall or the like, the combination of a pressure vessel having at least one lateral opening therein, right angle connecting rod means mounted on an outer end portion of the said lateral opening and having corner portions defining said right angle remote from said lateral opening, the said connecting rod means being connected to a driving means, angularly disposed conical bellows means mounted in fluid sealing relation over the lateral opening and with corner portions of the said connecting rod means, said connection with the driving means and driven means including engageable means permitting predetermined relative movement respectively between the connecting rod means, the driven means and the driving means.

10. In a mechanism for transmitting rotary motion through a pressure vessel wall or the like, the combination of a pressure vessel having at least one lateral hollow projection thereon, cap means on said hollow projection, the said cap means having adjustable fluid sealing means thereon, right angle connecting rod means pivotally mounted on the cap means in fluid sealing relation, the said connecting rod means being connected at end portions thereof to a driving means and a driven means in proximity to rigid connections for said driving and driven means, said connection with the said driving means and with driven means including slot and engaging pin at opposite end portions of the connecting rod means between the driver and driven means permitting predetermined transverse slidable movement between the connecting rod means and the said driven and driving means both within and without the pressure vessel.

11. In a device for transmitting rotary motion to a shaft extending within a pressure vessel or the like, the combination of a rotary shaft, angularly extending connecting rod means with 90 degree intersecting leg portions thereof extending within the pressure vessel and having fluid sealing means respectively cooperating with the pressure vessel and a corner of the leg portion of the connecting rod means at a location where the said connecting rod leg portion enters the pressure vessel through said fluid sealing means, the said connecting rod means having flexible attachment means at end limits thereof permitting predetermined transverse movement therebetween relative to the shaft when the latter member is rotated, a plurality of fixed pivotal connections for the leg portions of said connecting rod means, the said fixed pivotal connections forming a 90 degree angle with each other when viewed in plan and relative to each of the adjoining fixed pivotal connections, the length of the transverse space between each fixed pivotal connection being equal.

12. In a valve actuating mechanism for imparting rotary motion to a valve stem or the like in a pressure vessel, the said mechanism being movable in substantially a single plane transversely to the stem axis and comprising driver crank means and driven crank means, fluid sealed pivotally mounted angularly extending connecting rod means between said driver crank means and the driven crank means, said connecting rod means being pivotally connected to said driver crank means and driven crank means to permit relative transverse movement therebetween, the said driven crank means being rotatably connected to the valve stem, each of the said pivotal connections for the connecting rod means and for the respective driver crank means and the said driven crank means being spaced 90 degrees apart relative to each other, the spaces between each of said latter connections measured transversely thereto being equal to form a square when viewed in plan.

13. In an actuating mechanism for transmitting rotary motion through a pressure vessel wall to a rotatable shaft mounted in fluid sealing relation within the pressure vessel, the said mechanism comprising rotatably mounted driver crank means, pivotally connected driven crank means, connecting rods of L-form connected at one end thereof to said driver crank means at substantially right angles to each other, said connecting rod means being operatively disposed in different parallel planes having transversely shiftable connections with the driver crank means and with the said driven crank means, flexible enclosure means for a leg portion of the said connecting rod means in fluid sealing relation terminating at a corner portion of the L-form connecting rods, the said flexible means at one end thereof having fluid sealing connection with the pressure vessel, the said driven crank means being connected to the said rotatable shaft, a plurality of the connections for the said driver crank and driven crank means and the said connecting rod means being fixed against movement transverse to their axes, centerlines drawn parallel to axes through the said axially fixed connections forming a 90 degree angle with each other and equidistant apart transversely to form a square when viewed in plan.

14. In an actuating mechanism for transmitting rotary motion through a pressure vessel wall to a rotatable shaft mounted in fluid sealing relation within the pressure vessel, the said mechanism comprising rotatably mounted driver crank means, rotatably mounted driven crank means, connecting rods of L-form connected at one end thereof to said driver crank means at substantially right angles to each other, said connecting rod means having transversely shiftable connections with the driver crank means and with the said driven crank means, means enclosing a leg portion of the said connecting rod means in fluid sealing relation, the said latter enclosing means at an end removed from the pressure vessel having fluid sealing connection with the said connecting rods, the said driven crank means being rotatably connected at an end portion thereof to the rotatable shaft at least a supporting portion for the said rotatably mounted driver crank means and said driven crank means being fixedly positioned and with the central axes thereof at an angle of 90 degrees to each other equidistance apart to form a square when viewed in plan.

15. In a valve actuating mechanism for imparting rotary motion to a valve stem closure, or the like in a pressure vessel, the said mechanism being movable in substantially a common plane and comprising driver crank means and driven crank means connected rotatably to axially fixed connections, pivotally movable angularly extending connecting rod means between said driver crank and driven crank means, the said driver and driven crank means being mounted in fluid sealed relation to the pressure vessel, said connecting rod means being connected to said driver and driven crank means loosely to permit relative transverse movement therebetween, corner portions of the angularly extending connecting rod means forming right angles and being mounted at two of the said axially fixed connections for the driver crank and the driven crank to permit pivotal movement of the said rod means in a plane normal to the axis of rotation of the valve stem, the said driven crank means being movable through 360 degrees of movement and being rotatably connected to said valve stem, the latter rotatable connection being at right angles to said two of the axially fixed connections.

16. In a valve actuating mechanism for imparting rotary motion to a valve stem or the like, the said mechanism comprising pivotally movable driver crank means, pivotally movable driven crank means and pivotally movable angularly extending connecting rod means between said driver and driven crank means, the said connecting rod means being pivotally connected to said driver crank means and the said driven crank means to permit relative transverse movement therebetween, a plurality of flexible fluid sealing means of conical bellows configuration for the said connecting rod means at substantially right angles to a centerline of the connecting rod means at the point of attachment of the latter means to said driven crank means where said relative transverse movement is provided, the said fluid sealing means being pivotally mounted at a fixed position adjoining the said rod means, said driven crank means being rotatably connected to said valve stem to effect rotation of the latter member, the centerline of the connection for the connecting rod means and for the said driver crank means and driven crank forming a 90 degree angle with each other, the pivotal and rotatable movements of the respective driver crank means, the driven crank means and the connecting rod means being in a common plane normal to the axis of rotation of the stem cooperating with fixed connections spaced apart to form a square when viewed in plan.

17. In a mechanism for transmitting rotary motion through a pressure vessel wall or the like, the combination of a pressure vessel having at least one lateral opening therein, right angle connecting rod means mounted for tilting movement on an outer portion of the said lateral opening in fluid sealed relation thereto, the said connecting rod means being connected to a driving means and to a crank means driven by said rod means, said connection with the driving means including means on the rod means permitting predetermined relative transverse movement between the connecting rod means and the driving means, the said latter means being directly connected rotatably to axially fixed pivotal means, one of the latter being means actuated upon predetermined movement of said connecting rod means, centerlines drawn through the axially fixed means being spaced 90 degrees apart and in equidistant relation to each other to form a square when viewed in plan.

18. A motion transmitting mechanism, the combination of a pressure vessel wall with a lateral opening, at least one bellows means of conical configuration being attached to the wall at the opening, connecting rod means having leg portions enclosed within the bellows means, fixed connections for the said connecting rod means, the connecting rod means having a connection with a driving means and a driven means and with said fixed connections to a reduced end of the bellows means, the said connection permitting predetermined relative movement between the connecting rod means and the said driving means and the said driven means, centerlines drawn through the said fixed connections and also through said connections of said connecting rod means with said fixed connections at the reduced end of the bellows means being spaced 90 degrees and in equidistant relation to each other to form a square when viewed in plan.

19. A motion transmitting mechanism, the combination of a pressure vessel wall with a lateral opening, at least one bellows means thereon being attached to the wall around the opening, connecting rod means with a portion mounted in fluid sealing relation within the bellows means and connected at outer end limit thereof, the connecting rod means having angularly disposed portions with a slidable connection with a driving means and a driven means, said slidable connection having elongated relieved portions permitting predetermined relative movement between end limits of the connecting rod means and the respective driving means and driven means, the said driving means and the driven means being rotatably connected to fixed means, centerlines drawn through said fixed means and through said connections of the connecting rod means at the respective outer limits thereof being spaced 90 degrees apart and equidistant apart to form a square when viewed in plan.

20. In a device for transmitting rotary motion to a shaft through the wall of a pressure vessel or the like, the combination of a rotary shaft in the pressure vessel, driver means and driven means for the shaft, angularly extending connecting rod means with leg portions thereof 90 degrees apart, spaced apart fixed connections for supporting the connecting rod means, one of the rod leg portions extending within the pressure vessel, substantially conical fluid sealing bellows means cooperating with the pressure vessel and receiving said latter connecting rod leg portion at a location where the latter leg portion enters the pressure vessel, the other leg portion of connecting rod means extending beyond the said bellows means and having slidable attachment means with the driver means at end limits thereof permitting predetermined relative transverse movement of the connecting rod leg portion when the said shaft is rotated, the said supporting fixed connections being spaced apart 90 degrees and also equidistant apart to form the configuration of a square when viewed in plan.

References Cited in the file of this patent

UNITED STATES PATENTS

| 1,736,973 | King | Nov. 26, 1929 |
| 2,821,860 | Huston | Feb. 4, 1958 |

OTHER REFERENCES

| 102,171 | Austria | Dec. 28, 1925 |